March 17, 1931.                R. M. PIERSON                1,796,343
              BATTERY HOLD-DOWN AND HANDLE STRUCTURE
                    Filed March 1, 1926        2 Sheets-Sheet 1
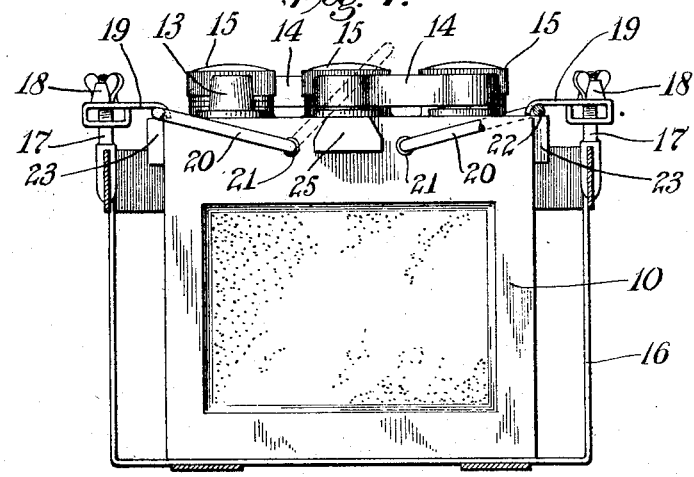
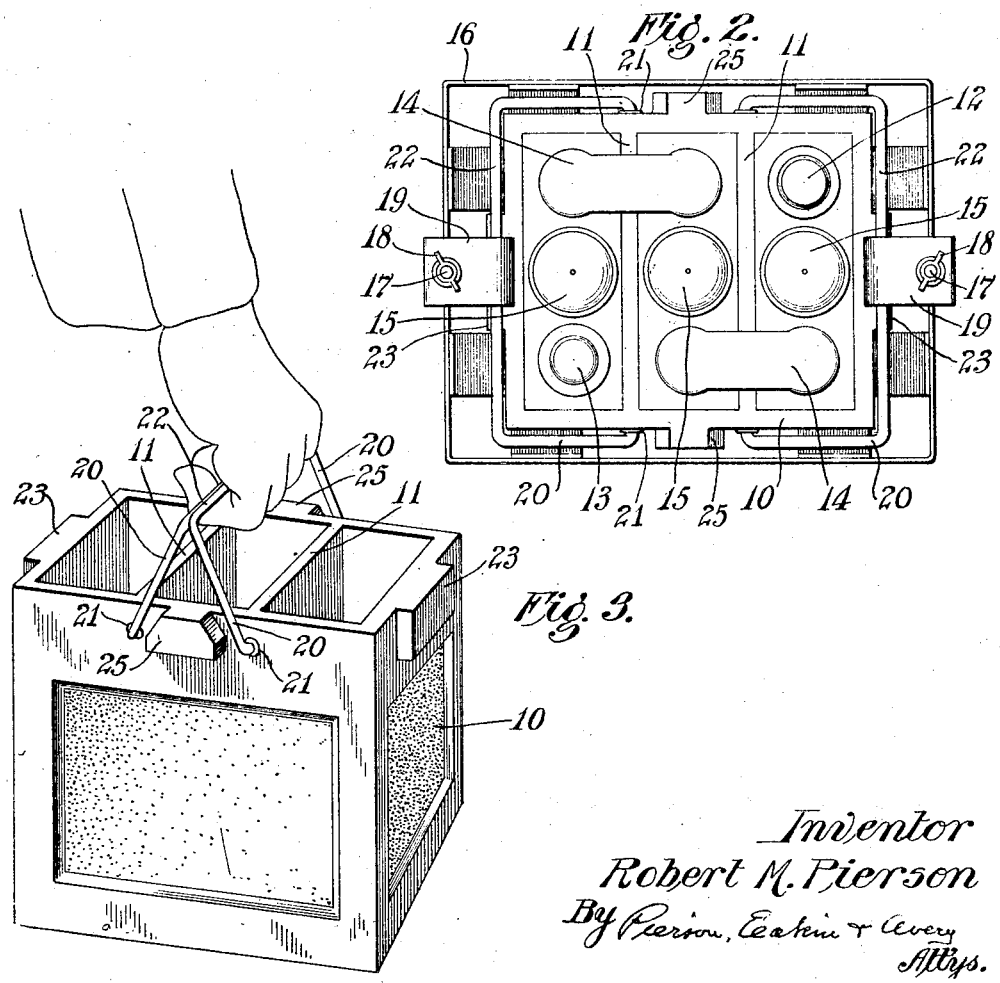
Inventor
Robert M. Pierson
By Pierson, Eakin & Avery
           Attys.

March 17, 1931. R. M. PIERSON 1,796,343
BATTERY HOLD-DOWN AND HANDLE STRUCTURE
Filed March 1, 1926 2 Sheets-Sheet 2
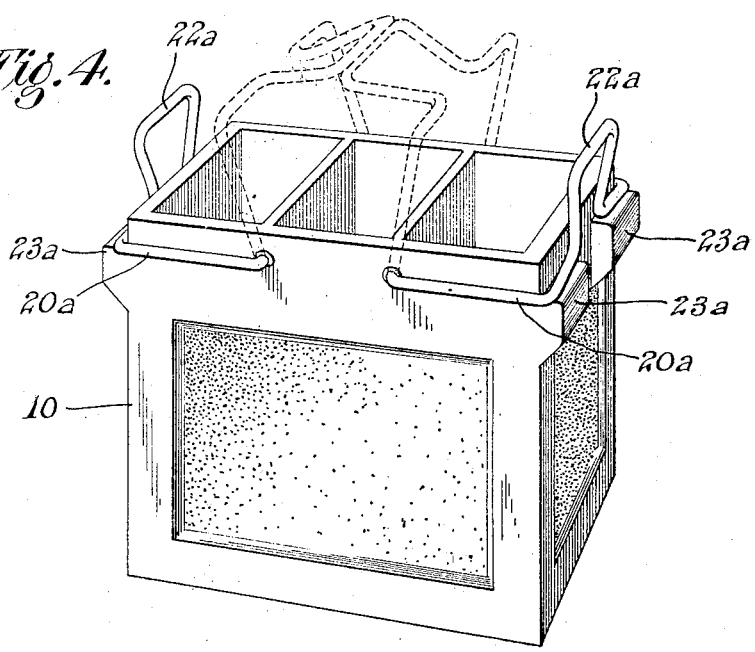
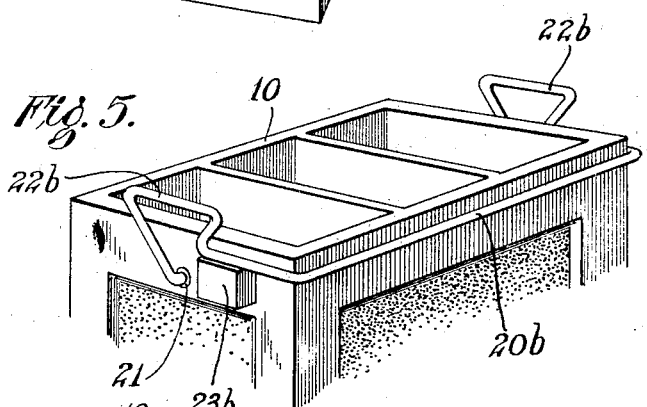
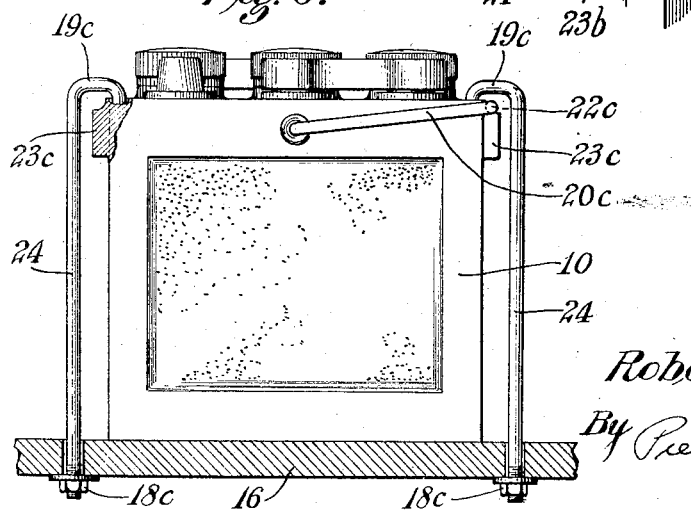
Inventor
Robert M. Pierson
By Pierson, Eakin & Avery
Attys.

Patented Mar. 17, 1931

1,796,343

UNITED STATES PATENT OFFICE

ROBERT M. PIERSON, OF AKRON, OHIO, ASSIGNOR TO THE B. F. GOODRICH COMPANY, OF NEW YORK, N. Y., A CORPORATION OF NEW YORK

BATTERY HOLD-DOWN AND HANDLE STRUCTURE

Application filed March 1, 1926. Serial No. 91,315.

This invention relates to portable receptacles, and more particularly containers for storage batteries adapted to be used in the starting and lighting systems of automobiles and for other purposes.

One of my objects is to provide an improved handle arrangement for transporting the battery and a further object is to provide a novel combination of such an arrangement with hold-down clamps or devices permitting the battery to be anchored in a simple and effective manner or carried with one hand when it is desired to transport it.

Starting and lighting batteries for automobiles, as well as the "A" storage batteries used in radio work are composed of a number of electrically-connected cells, usually three, mounted in an insulating container which may be of wood, hard rubber, or a composition of hardened asphaltic or bituminous binder and a filling substance of an earthy or fibrous nature.

For carrying the battery a bail is sometimes used, but bails for this purpose, so far as I am aware, have heretofore been of a flexible, rope-like construction, rendered acidproof, which is rather expensive and unsatisfactory, and have not been disposed with particular reference to the position or action of any hold-down devices for anchoring the battery.

The more common arrangement is to provide fixed handles projecting from the upper edges of the container at its two ends, these handles being either of metal connected permanently or detachably with the container, or being of the same material as the container and molded integrally therewith. The hold-down clamps are applied either over the top bars of these handles or to the edges of the container between the legs of the handles. Such handles are more or less unsatisfactory because of the expense of obtaining a proper and durable connection with the container and because of the wear and strain placed upon the latter by the clamps, and also for the reason that a person desiring to transport the battery has either to use both hands or provide himself with some kind of an auxiliary carrier.

My present invention provides an inexpensive and highly convenient arrangement of a metallic bail or bails having a special disposition with reference to the structural features of the battery or container and also with reference to a hold-down clamp or clamps, so as to be readily accessible when required for use in transporting the battery and folded in a compact relation to the other parts when the clamping devices are in use.

In the preferred arrangement, I provide a pair of bails adapted to be brought together in one hand when the battery is to be carried, or folded down against suitable stop or rest portions on the container and normally coacting with the clamps, in this position, to anchor the container.

Of the accompanying drawings, Fig. 1 is a side elevation, partly in section, showing a storage battery equipped with a double-bail carrying arrangement embodying my invention, in combination with a battery support and hold-down clamps.

Fig. 2 is a plan view.

Fig. 3 is a perspective view showing the container being carried in one hand.

Fig. 4 is a perspective view showing a modification.

Fig. 5 is a perspective view showing a second modification.

Fig. 6 is a side elevation, partly in section, showing a third modification.

Referring at first to Figs. 1, 2 and 3, 10 is a battery container of the type commonly made of a moldable insulating material and provided with integral cross partitions 11, 11, dividing its interior into three cell compartments.

In Figs. 1 and 2, 12, 13 are the two end terminals for connection with the external circuit, 14, 14 are the connectors for the intermediate terminals, and 15, 15 are the usual filling and vent plugs. 16 is a cage whose bottom portion acts as a support for the battery, and 17, 17 are screw-posts mounted on the end bars of said cage and constituting portions of a pair of clamping devices, each of which includes a wing-nut 18 on the post and a hooked clamping plate or jaw 19 operated by said nut. These particular clamps represent one of a number of well-known types of devices in common use for holding down storage batteries.

20, 20 represent a pair of stiff, metallic bails pivoted to the sides of the container 10 at equal distances on either side of its middle transverse plane, and adapted to act as handles to be grasped in one hand when it is desired to transport the battery, as shown in Fig. 3.

These bails are preferably made of stout steel wire which may, if desired, be provided with a non-corrosive coating such as lead. Their inwardly-turned ends are sprung into pivot-holes in the walls of the container and may bear directly against the material of the container, or the holes may be lined with metal bushings or cups such as 21, which are preferably inserted after the container is formed.

Should either bail become seriously damaged by corrosion or otherwise it is a simple and inexpensive matter to substitute a new one, the removal and replacement being effected by merely springing the legs apart.

When the battery is in use, the bails fold down compactly below the tops of the filler plugs 15 in a position where they are accessible from above and may be turned into their upright positions when it is necessary to lift the battery out of its cage or compartment, or transport it. When folded down, as shown in Figs. 1 and 2, the cross-bars 22 of the bails 20 rest against suitable stop portions on the container such, for example, as the upper edges of the end walls of the container, which in this instance are extended by a pair of integral molded lugs 23 serving both to reinforce the end walls and to furnish finger-holds for lifting the battery on occasions, instead of using the bails for that purpose.

25, 25 are stop lugs molded on the side walls of the container for limiting the movement of either of the bails 20 in a direction opposite to its normal folded-down position, as shown, for example, in broken lines in Fig. 1, so that the bails cannot accidentally fall across the terminals of either end cell and short-circuit that cell.

When the bails are folded down, their cross-bars 22 rest in a position adjacent to the clamp-plates 19, and in the present instance they cooperate with said clamp-plates to furnish keeper devices for receiving the larger or vertical component of the clamping pressure and distributing it along the upper edges of the container. They also resist the outward horizontal and diagonal components of the clamping pressure, if any, and transmit these latter components directly through the side legs of the bails to their in-turned ends, which are pivoted in the holes in the side-walls of the container, or they prevent the development of such a component through flexure of the end wall of the container as commonly observed in cases where the clamps are applied to the end wall or to a handle formed or fixed thereon. Thus I provide an arrangement which greatly relieves the strains upon the more or less fragile walls of the container itself, and which is far superior to prior arrangements for receiving the clamping thrusts upon the edges of the container, directly or through interposed wear plates, or upon fixed handles projecting upwardly from the edges and formed or anchored upon the end walls.

In Fig. 4, I show a modification in which a battery container 10 is provided with a pair of stout wire bails $20^a$ pivoted to the side-walls in the same relation as described in the previous embodiment, but the end portions of the cross-bars of said bails rest horizontally upon pairs of spaced lugs $23^a$ formed integrally upon the end walls of the container, below the upper edge of the latter, and the intermediate portions of said cross-bars are bent upwardly to form a pair of handle loops $22^a$ which project upwardly above the container substantially in the same position as the fixed handles which are ordinarily supplied. This construction provides an arrangement adapted for either of the two commonly used clamping arrangements, in one of which the clamps take over the elevated handles and in the other of which they engage the upper edges of the container between the side legs of the loops. When it is necessary to transport the battery, the bails $20^a$ may be turned upwardly as shown in broken lines and their handle portions brought together and grasped in one hand.

In Fig. 5 I show a second modification, wherein a single bail $20^b$ is placed longitudinally of the container 10 and pivoted at opposite ends on the middle vertical lines of the end walls, as at 21. The legs of the bail are bent to form looped handles $22^b$ projecting above the upper edges of the container body and said legs, when folded, rest upon integral lugs on the respective end walls, one of which lugs is shown at $23^b$. The hold-down clamps are adapted to take over the loops $22^b$ or over the upper edges of the container body between the legs of the loops, as the case may be. The container may be transported either with one hand by using $20^b$ as a bail or with two hands by using the loops $22^b$ after the manner of ordinary fixed handles.

In Fig. 6 I show a third modification in which the battery container 10 is provided with a single carrying bail $20^c$ pivoted to the side-walls and adapted, when the battery is in use, to be folded down so that its cross-bar $22^c$ rests against the upper edge of either one of a pair of integral lugs $23^c$ formed upon the end walls, said upper edges of the lugs being depressed slightly below the upper edges of the container so that the cross-bars of the bails reside practically flush with or just below the latter. 24, 24 are hold-down clamps having threaded stems projecting through holes in a supporting floor 16ᶜ and provided with clamping nuts 18ᶜ below said floor, said clamps having hooked upper ends 19ᶜ directly engaging the upper edges of the end walls of the container. In this case, the clamping portion 19ᶜ of the hold-down does not engage the cross-bar of the bail, although it overlies the cross-bar and acts as a guard for the latter. While this arrangement lacks some of the advantages of the ones previously described, it affords a compact and readily accessible arrangement of the carrying bail which is superior for transporting purposes to either the double fixed handle or the flexible bail arrangements of the prior art.

I claim:

1. An insulating battery container having an end-wall structure adapted to receive a hold-down device in the vicinity of its upper edge and constructed to resist the strains imposed by such device, side walls, and a stiff, metallic, carrying bail pivoted to said side walls and having a transverse grasping portion normally resting upon said upper edge of the end wall structure.

2. A battery including an insulating container having end walls constructed to receive and resist the thrust of hold-down devices, said battery having electric terminals exposed on its upper side, and a metallic carrying bail normally resting with its grasping portion upon the upper edge of one of said end walls, the arrangement being such that said grasping portion is out of contact with said terminals at both extremes of its movement.

3. An insulating battery container having a pair of pivoted, metallic, carrying bails provided with grasping portions adapted to be brought together over the container body and grasped in one hand, said bails normally resting with their grasping portions in the vicinity of the upper edges of the respective end walls of the container, and stop means on the container adapted to be abutted by the bails to limit their relative downward movement to constitute them hold-down members for the container.

4. An insulating battery container having side and end walls, a pair of stiff, metallic carrying bails pivoted to the side walls and provided with grasping portions adapted to be brought together over the container body, said bails normally resting in folded position with their grasping portions upon the upper edges of the respective end walls, and stop means on the container coacting with the side legs of the bails for limiting the swinging movement of either of said bails in a direction opposite to its normal position.

5. In combination a container having shoulder means thereon, a handle for said container and means on said handle engageable with the shoulder means on the container by rocking movement of the handle with respect to the container, said shoulder means being disposed adjacent the top and at the end of the container and permitting the handle to be tilted up over the top of the container in engaging the handle with and disengaging same from said shoulder means.

In witness whereof I have hereunto set my hand this 24th day of February, 1926.

ROBERT M. PIERSON.